United States Patent
Guarriello, Sr. et al.

[19]

[11] Patent Number: 5,941,019
[45] Date of Patent: Aug. 24, 1999

[54] NURSERY CONTAINER WITH ATTACHMENT DEVICE

[75] Inventors: Henry J. Guarriello, Sr., Greencastle; Joseph A. Guarriello; Henry J. Guarriello, Jr., both of Boiling Springs; Theodore J. Guarriello, Chambersburg, all of Pa.

[73] Assignee: Nursery Supplies, Inc., Chambersburg, Pa.

[21] Appl. No.: 08/997,717

[22] Filed: Dec. 23, 1997

[51] Int. Cl.⁶ .................................................. A01G 9/02
[52] U.S. Cl. .................................. 47/66.6; 47/66.7; 47/67
[58] Field of Search ..................... 47/66.6, 66.7, 47/67, 81, 87; 248/318, 146; 40/661.11, 661.12, 645, 663, 642.01, 642.02

[56] References Cited

U.S. PATENT DOCUMENTS

| | | |
|---|---|---|
| D. 254,236 | 2/1980 | Devito et al. . |
| D. 367,737 | 3/1996 | McNaughton et al. ............... D30/133 |
| 1,069,728 | 8/1913 | Russell ................................. 40/661.12 |
| 1,077,879 | 10/1913 | Hart ........................................ 47/66.6 |
| 1,337,586 | 2/1920 | Bedinger ................................... 40/672 |
| 1,381,975 | 6/1921 | Dumais ................................ 40/642.01 |
| 1,407,085 | 2/1922 | Rau ..................................... 40/661.11 |
| 1,763,130 | 6/1930 | Cartwright ............................... 248/146 |
| 1,779,496 | 10/1930 | Scott ........................................ 40/317 |
| 1,782,193 | 11/1930 | Callen ....................................... 40/645 |
| 1,808,292 | 6/1931 | Coppersmith ............................. 40/645 |
| 1,891,933 | 12/1932 | Hutt ..................................... 40/642.01 |

(List continued on next page.)

FOREIGN PATENT DOCUMENTS

| | | |
|---|---|---|
| 390989 | 10/1990 | European Pat. Off. . |
| 2 563 356 | 10/1985 | France . |
| 2 641 937 | 7/1990 | France . |
| 2 642 266 | 8/1990 | France . |
| 281478 | 1/1914 | Germany . |
| 26 44 457 | 4/1978 | Germany . |
| 36 40 039 | 5/1988 | Germany . |
| 199976 | 7/1923 | United Kingdom . |
| 697874 | 9/1953 | United Kingdom . |
| 2 052968 | 2/1981 | United Kingdom . |
| 2 216 379 | 10/1989 | United Kingdom . |
| 2 233 540 | 1/1991 | United Kingdom . |
| 2 260 308 | 4/1993 | United Kingdom . |
| 2 263 052 | 7/1993 | United Kingdom . |
| 2 277 314 | 10/1994 | United Kingdom . |
| WO 93/19446 | 9/1993 | WIPO . |

*Primary Examiner*—Thomas Price
*Assistant Examiner*—Fredrick T. French, III
*Attorney, Agent, or Firm*—Seidel, Gonda, Lavorgna & Monaco, PC

[57] ABSTRACT

The present invention is directed to a nursery container for plants and the like. The nursery container includes a bottom, a side wall extending upward from the bottom, and a lip formed on an upper portion of the side wall. A first attachment component formed on the nursery container, preferably on the container lip. The first attachment component mates with a second attachment component for attaching an ancillary or attachable item to the nursery container. In one embodiment of the invention the first attachment component extends through a hole formed in the nursery container and includes a base located on an inside surface of the nursery container. A retaining flange is formed on the first attachment component at a location adjacent the outside surface of the container. The retaining flange and the base prevent the first attachment component from coming out the hole in the container. The first attachment component is preferably a locking member having a channel formed in it. The channel is adapted to receive a protruding boss formed on the second attachment component. The second component is attached to the ancillary item. The first and second attachment components can be either removable or non-removable depending on the intended use of the container. Various items can be attached to the nursery container using the present invention including, but not limited to, a placard for displaying information, a handle for carrying the nursery container, a hanger for hanging the nursery container, a bag for carrying promotional or plant care materials, and/or a stake for displaying information.

35 Claims, 10 Drawing Sheets

U.S. PATENT DOCUMENTS

| | | | |
|---|---|---|---|
| 2,641,074 | 6/1953 | Richmond | 40/633 |
| 2,810,176 | 10/1957 | Gaafar | 24/551 |
| 3,047,971 | 8/1962 | Howard | 40/642.02 |
| 3,057,093 | 10/1962 | Gallo | 47/66.7 |
| 3,184,203 | 5/1965 | Steen | 248/318 |
| 3,241,264 | 3/1966 | Porter et al. | 47/38.1 |
| 3,295,236 | 1/1967 | Wishinia | 40/663 |
| 3,416,247 | 12/1968 | Sternberg | 40/632 |
| 3,422,558 | 1/1969 | Fee | 40/306 |
| 3,656,247 | 4/1972 | Bushnell et al. | 40/633 |
| 3,662,480 | 5/1972 | Gilson, Jr. et al. | 40/633 |
| 3,943,661 | 3/1976 | DeVito et al. | 47/67 |
| 4,070,745 | 1/1978 | Schimmelman | 29/268 |
| 4,138,803 | 2/1979 | Sherlock | 47/318 |
| 4,221,063 | 9/1980 | Charles et al. | 40/665 |
| 4,318,234 | 3/1982 | Charles et al. | 40/665 |
| 4,379,372 | 4/1983 | Alexander et al. | 40/645 |
| 4,392,279 | 7/1983 | Schwager | 24/589 |
| 4,440,371 | 4/1984 | Wijsman | 248/318 |
| 4,442,629 | 4/1984 | Anderson | 47/71 |
| 4,592,166 | 6/1986 | Tendrup et al. | 47/67 |
| 4,622,776 | 11/1986 | Pfaff | 47/67 |
| 4,658,540 | 4/1987 | Houghard | 47/67 |
| 4,694,596 | 9/1987 | Fast | 40/20 R |
| 4,744,171 | 5/1988 | Hilliard | 47/67 |
| 4,780,974 | 11/1988 | Mitchell | 40/674 |
| 4,791,742 | 12/1988 | Stover | 40/673 |
| 5,018,286 | 5/1991 | Zahner | 40/665 |
| 5,088,234 | 2/1992 | Wong | 47/67 |
| 5,226,809 | 7/1993 | Franco | 24/704.1 |
| 5,285,908 | 2/1994 | Rogers | 211/118 |
| 5,308,671 | 5/1994 | Wells | 428/99 |
| 5,438,796 | 8/1995 | Nathan | 47/66.6 |
| 5,448,846 | 9/1995 | Peterson et al. | 40/633 |
| 5,457,906 | 10/1995 | Mosher, Jr. | 40/633 |
| 5,479,797 | 1/1996 | Peterson | 63/3 |
| 5,537,768 | 7/1996 | Tesselaar et al. | 40/645 |
| 5,581,924 | 12/1996 | Peterson | 40/633 |

NURSERY CONTAINER WITH ATTACHMENT DEVICE

FIELD OF THE INVENTION

The present invention is directed to nursery containers and, more particularly, to an improved nursery container with an attachment device attached to it for mounting ancillary items, such as informational placards and the like.

BACKGROUND OF THE INVENTION

Nursery containers are utilized extensively in the horticultural and nursery industry for growing, transporting, and marketing plants. The primary function of the nursery container, irrespective of its intended use (i.e., growing, transporting, or marketing), is to retain soil around the roots of a plant in order to keep the plant viable. As such, other needs, such as the displaying of pricing information, has to date been secondary when designing the nursery container.

Major retail stores prefer that pricing and/or bar code information be attached directly to the nursery container such that the information is not easily or inadvertently removed prior to check-out. The retail stores also prefer that the pricing information be conveniently located to permit the check-out personnel and customers to readily see the price of the item. Furthermore, in order to minimize lines at check-out counters, the retailers would like the pricing information to be consistently placed in the same location on each container to facilitate scanning and/or reading during check-out.

It has not, however, been feasible to address all these desires with existing nursery container designs since, as described above, conventional containers are designed with little, if any, attention to the displaying of information. As such, it has become customary for retailers to adhere pricing labels (such as bar codes) to the side or bottom of the nursery container. However, since these containers are exposed to dirt when the plant is placed within the container, a thin film of dirt can accumulate on the surface of the container making adhesion of the label difficult. Even if the label does initially adhere to the container, it may not be in the preferred location, or it may ultimately fall off prior to purchase.

As discussed above, it is also desirable to place information about the plant on the nursery container in a relatively conspicuous location. This allows the personnel at the nursery to arrange the plants by type and allows the ultimate purchaser to review the information about the plant prior to purchase. It has been conventional in the art to utilize plant stakes to display such information. These stakes are inserted into the soil of the plant near the container rim. However, it is quite common for these stakes to fall out of or be removed from the nursery container. This makes proper identification of the plant difficult and leaves the purchaser helpless as to proper care for the plant. Also, since many nurseries now utilize automated machines for pruning container grown plants, the stakes cannot be inserted into the containers until the plants are ready to ship to a retailer.

Another method for attaching pricing labels and product information to the nursery container is by stapling the information directly to the lip or side of the container. One drawback to this method of attaching the labels is that there is little or no consistency in where the information is located. Also, the staple may interfere with the information contained on the label, such as the bar code lines. It is also difficult to staple the labels to the container after the plant has been placed into the container. The individual attaching the label (e.g., the nursery or retail store personnel) must also have a suitable stapling tool. Furthermore, many customers complain that the staples ruin the appearance of the container and are extremely difficult to remove. Another drawback to the use of staples, especially in today's environmentally conscience society, is that the containers cannot be recycled with the staple still in the container. The purchaser or recycler must first remove the staple before recycling the container.

Yet another method for attaching price labels or other information to the container is by needling a plastic strip into the container side or lip. A placard is then attached to the other end of the strip. The primary drawback to this method of attaching pricing information is that it requires each nursery or retailer to have a needling tool to attach the plastic strip.

Due to the complexities associated with attaching labels to the containers, some nurseries have endeavored to attach pricing information directly to the plant stem or branch. However, labels attached directly to the plant can easily fall off and are difficult to locate during check-out, especially on large plants.

A need therefore exists for attaching a placard and/or other ancillary items to a nursery container so that the ancillary item is difficult to remove and is consistently and conveniently located.

SUMMARY OF THE INVENTION

The present invention is directed to a nursery container for plants and the like. The nursery container includes a bottom, a side wall extending upward from the bottom, and a lip formed on an upper portion of the side wall. A first attachment component is formed on the nursery container, preferably on the container lip. The first attachment component mates with a second attachment component for attaching an ancillary or attachable item to the nursery container.

In one embodiment of the invention the first attachment component extends through a hole formed in the nursery container and includes a base located on an inside surface of the nursery container. A retaining flange is formed on the first attachment component at a location adjacent the outside surface of the container. The retaining flange and the base prevent the first attachment component from coming out the hole in the container. In an alternate embodiment, the first attachment component is bonded or molded directly into the container.

The first attachment component is preferably a locking member having a channel formed in it. The channel is adapted to receive a protruding boss formed on the second attachment component. The second attachment component is attached to the ancillary item. The attachment components according to the present invention can be either removable or non-removable depending on the intended use of the container.

The present invention also contemplates attachment of a variety of ancillary items. In one embodiment, the ancillary item is a placard for displaying pricing or other information. In another embodiment, the ancillary item is a handle which is attached to the nursery containers using the attachment components. In still another embodiment, the ancillary item is a hanger for hanging the nursery container. A display stake is also disclosed as one item for attachment to the nursery container. A further embodiment utilizes the attachment components to attach a bag containing promotional and/or plant case materials to the container.

The present invention provides a novel nursery container design which permits attachment of various items to the container while addressing many of the deficiencies associated with the prior art container displays.

The present invention can be utilized on nursery containers already in production and, therefore, no modifications to the container molds is necessary.

The attachment components can be made from any suitable color to enhance the overall appearance of the container. Moreover, the preferred attachment components are made from material capable of being recycled with the container itself.

The foregoing and other features and advantages of the present invention will become more apparent in light of the following detailed description of the preferred embodiments thereof, as illustrated in the accompanying figures.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DETAILED DISCUSSION OF THE PREFERRED EMBODIMENTS

Figure 1:
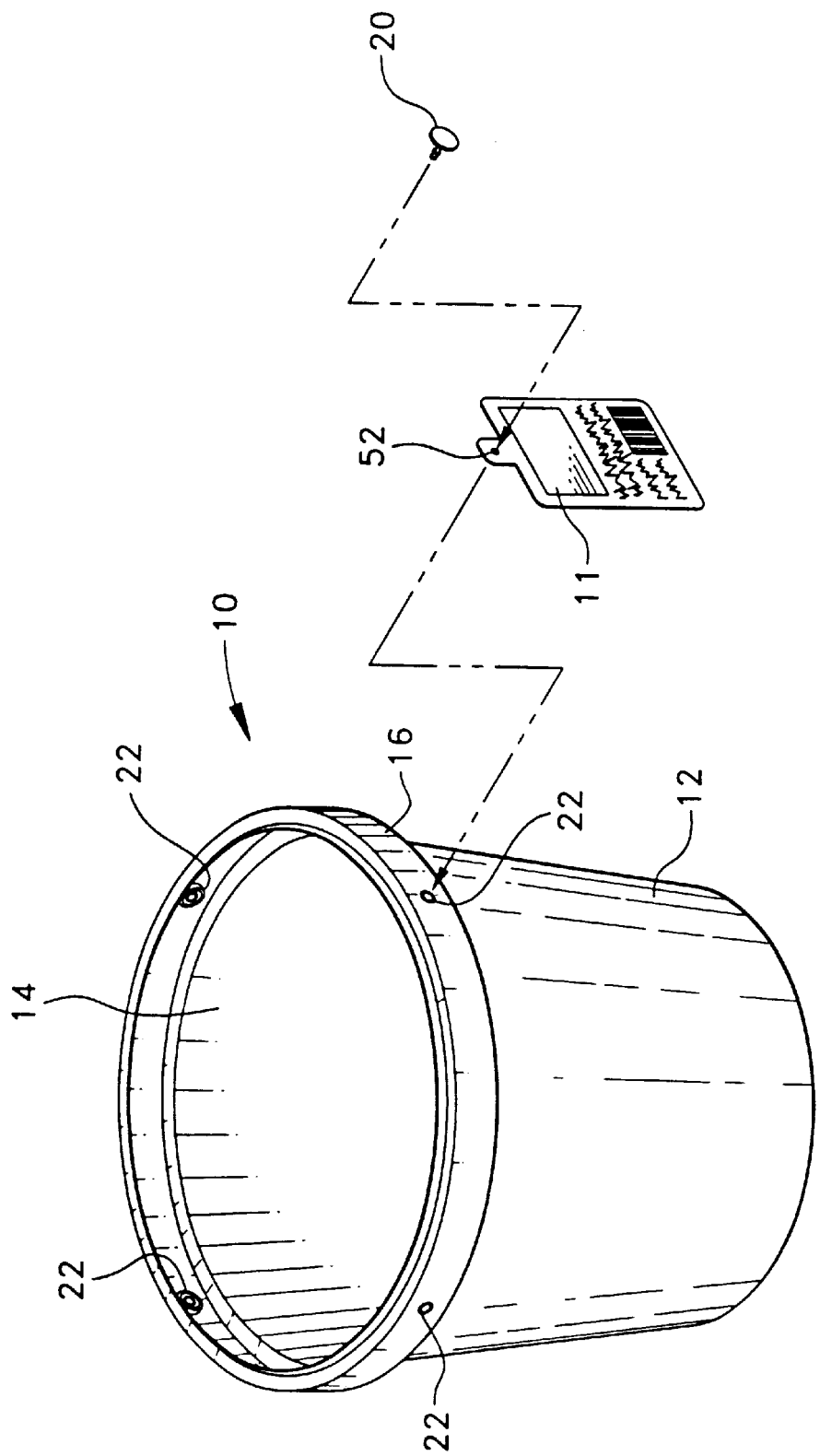
FIG. 1 is an exploded isometric view of a nursery container made according to the present invention.

Referring now to the drawings, wherein like reference numerals illustrate corresponding or similar elements throughout the several views, FIG. 1 illustrates a nursery container 10 according to the present invention. The nursery container 10 includes a bottom (not shown), at least one side wall 12, and an open top 14. A rim or lip 16 is formed around at least a portion of the open top 14. In the illustrated embodiment, the side wall 12 of the nursery container 10 is substantially cylindrical and extends from the bottom to the lip 16. The lip 16 may be formed around only a portion of the container top or it may completely encircle the top depending on the intended use of the nursery container. The lip 16 is shown stepped outward from the side wall 12. There is, however, no need for the lip 16 to be spaced outward from the side wall 12. On the contrary, the lip 16 can be an integral extension of (i.e., portion of) the side wall 12. While the figures illustrate a cylindrical side wall on the container, those skilled in the art would readily appreciate that a variety of other side wall configurations can be utilized in the nursery container 10 of the present invention.

The nursery container 10 can be made from a variety of materials (e.g., plastic or metal) and/or processes (e.g., blow molding or injection molding). In one preferred embodiment, the nursery container 10 is blow molded from high-density polyethylene plastic material into the configuration shown in FIG. 1. Nursery containers 10 having the general configuration discussed above are manufactured and sold by Nursery Supplies, Inc., Chambersburg, Pa.

The present invention also includes an attachment device 18 for attaching ancillary or supplemental items, such as an information or display placard 11, to the nursery container 10. The attachment device 18 includes first and second attachment components which are configured to engage with one another. One component of the attachment device 18 is mounted to the nursery container 10 and the other component is mounted to the ancillary item, such as the placard 11.

Figure 2:
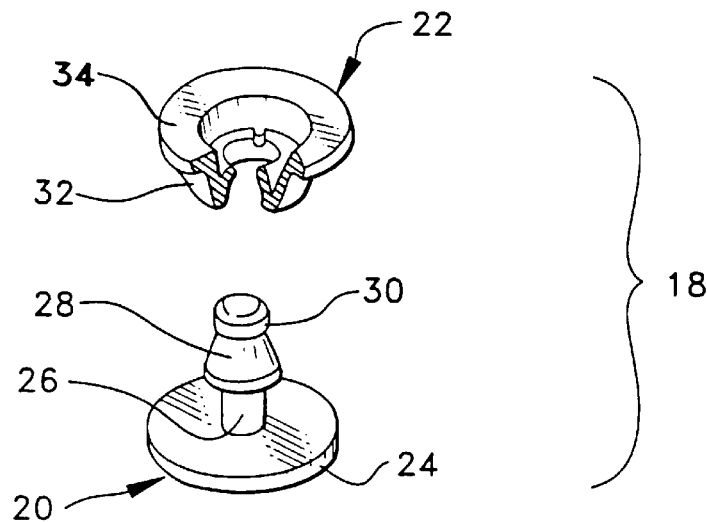
FIG. 2 is an isometric view of one preferred embodiment of the two components which form one preferred attachment device utilized in the present invention.
Figure 3:
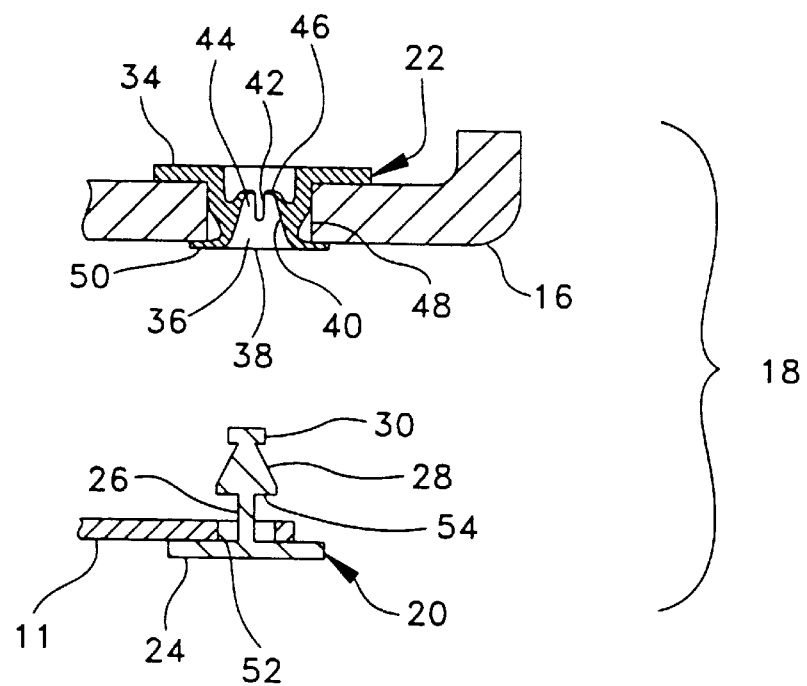
FIG. 3 is a cross-sectional view of a portion of the nursery container illustrating two components of the preferred attachment device according to the present invention.

Referring now to FIGS. 2 and 3 wherein one preferred embodiment of the attachment device 18 is shown, one of the components of the attachment device 18 is a protruding pin member 20 and the other component is a locking member 22 which receives a portion of the pin member 20. The pin member 20 is configured to mate or otherwise engage with the locking member 22. The pin member 20 includes a base 24 which is preferably substantially planar. The base 24 is shown as circular in shape, however other shapes may be substituted therefor.

A shank 26 is attached to and protrudes outward from the base 24. The shank 26 can be formed with any desired shape, but is preferably cylindrical. A pin head 28 is formed on a distal end of the shank 26. In the exemplary embodiment shown, the pin head 28 is frusto-conical in shape with a maximum diametrical dimension greater than the diameter of the shank 26. The diameter of the frusto-conical pin head 28 tapers down as it gets further from the base 20. A boss or nub 30 is formed at or near the tip of the pin head 28. The boss 30 has a diameter greater than the diameter of the pin head 28 at its tip. While the boss is shown as being a circular disc, any suitable shape can be used in the present invention. The shank 26, pin head 28, base 24 and boss 30 are preferably formed as an integral unit.

The locking member 22 shown in FIGS. 2 and 3 includes a receptacle 32 which extends outward from a base 34. A channel 36 extends into the receptacle 32 from an opening 38 at an end of the receptacle 32 distal from the base 34. The periphery of the channel 36 is defined by at least one converging wall 40. In one preferred embodiment, the wall 40 of the channel 36 is frusto-conical in shape, with its narrowest end closer to the base 34. There is at least one, and preferably three, notches 42 formed in the wall 40 at its narrowest end defining retention tabs 44. The notches 42 permit the retention tabs 44 to bend or deflect when sufficient force is applied to them. The tips of the retention tabs 44 form a locking ridge 46 which, as will be discussed hereinafter, locks the pin member 20 to the locking member 22.

The attachment of the pin member 20 to the locking member 22 is as follows. The boss 30 and pin head 28 of the pin member 20 are inserted through the opening 38 in the receptacle 32 of the locking member 22. The diameter of the boss 30 (or width dimension if the boss 30 is not circular) is smaller than the diameter (or width) of the opening 38 so that the pin head 28 and boss 30 fit easily into the channel 36. The size of the boss 30, however, prevents it from initially passing through the narrowest end of the channel 36 which has a diameter (or width) less than that of the boss 30. When sufficient force is applied to the pin member 20 urging it toward the locking member 22, the boss 30 presses against retention tabs 44 causing the tabs to deflect away from the pin head 28. This permits the boss 30 to pass the locking ridges 46 on the retention tabs 44. Once the boss 30 has cleared the locking ridges 46, the elasticity of the retention tabs 44 causes them to return to their prior undeflected position. As such, the locking ridges 46 are located under the boss 30 preventing it from being pulled back out of the channel 36. Thus, once the pin member 20 is engaged with the locking member 22 the two components cannot be easily separated.

The pin member 20 and locking member 22 are both preferably made from injection molded plastic, such as polypropylene or polyethylene, although any other suitable material could be utilized. In order to provide a container 10 which is recyclable, the attachment device 18 (or at least the portion of the device which is mounted to the nursery container) is preferably made from the same material as the container itself. An additional advantage of the present invention is that the attachment device 18 can be molded in a variety of colors to augment the overall appearance of the container.

The attachment device 18 described above is discussed in detail in U.S. Pat. No. 5,448,846 and is manufactured by the Precision Dynamics Corporation, San Fernando, Calif. However, those skilled in the art would readily appreciate that other embodiments of the pin member 20 and/or locking member 22 can be utilized in the present invention and are well within the purview of the claims. For example, the various pin and locking members shown in U.S. Pat. No. 4,221,063 could also be utilized in the present invention for attaching ancillary items to the container.

Referring back to FIGS. 1 and 3, in one preferred embodiment of the invention, the first attachment component of the attachment device 18 which is secured to the nursery container 10 is the locking member 22. The locking member 22 is preferably attached to the lip 16 of the nursery container 16. In order to attach the locking member 22 to the lip 16, a hole 48 is first formed in the lip 16 and the receptacle 32 is inserted through the hole 48 such that the base 34 of the locking member 22 is located inside the nursery container 10. To prevent the locking member 22 from falling out of the lip 16, a retaining flange 50 is formed on (or attached to) the end of the receptacle 32 located adjacent the external surface of the container 10 as shown in FIG. 3. Thus, the retaining flange 50, acting in conjunction with the base 34, secures the locking member 22 to the nursery container 10. The retaining flange 50 can be formed by any suitable manner known to those skilled in the art, such as by crimping the edges of the receptacle 32. The retaining flange 58 may, instead, be a barb formed on the receptacle 32 which deflects when the receptacle 32 is initially inserted into the hole and prevents the locking member 22 from being withdrawn from the hole. Retention of the locking member 20 to the nursery container 10 can, in the alternative, be provided by applying adhesive (not shown) in the hole 48 to bond the receptacle 32 to the lip 16.

In the preferred embodiment illustrated, the second attachment component of the attachment device 18 is the pin member 20. The pin member 20 is attached to and/or formed on the placard 11 or other ancillary item for subsequent engagement with the nursery container 10. As shown in the figures, the pin head 28 and boss 30 of the pin member 20 are inserted through a mounting hole 52 in the placard 11. The preferred diameter of the mounting hole 52 is slightly smaller than the maximum width of the pin head 28 such that the placard 11 is secured between the base 24 and a bottom 54 of the pin head 28. It may, however, be more desirable to mold the pin member 20 integral with the placard 11, or simply adhere the base 24 of the pin member 20 to the display placard 11. However the pin member 20 is formed on the placard 11, it should protrude a sufficient distance therefrom to permit engagement of the boss 30 with the locking member 22.

While the illustrated embodiment shows the locking member 22 attached to the nursery container 10, it is also contemplated that the pin member 20 may, instead, be attached to the nursery container 10 by insertion through a hole 48 formed in the container. In this alternate embodiment, the pin member 20 is secured to the container by forming the hole 48 in the container slightly smaller than the maximum width of the pin head 28. After the pin member 20 is forced into the hole 48, the bottom 54 of the pin head 28 functions as the retaining flange to prevent the pin member 20 from sliding out of the hole 48. The locking member 22 would then be attached to the placard 11 or other ancillary item for subsequent attachment to the nursery container 10.

It is also envisioned that the attachment components may, in the alternative, be attached to the external surface of the nursery container 10 with adhesive, as opposed to insertion through a hole formed in the container. In such an embodiment, it is important to utilize an adhesive which has suitable shear and tension strengths to withstand the anticipated loads that will be applied to the attachment device 18. Those skilled in the art would be readily capable of selecting a suitable adhesive in light of the teachings provided herein.

In a further variation of the invention, it may be desirable to utilize one of many known manufacturing processes for attaching the attachment component to the container. For example, the attachment component could be attached to the container by ultrasonic welding or insert molding. The component could also be injection molded as part of the container. Those skilled in the art of container manufacturing could readily apply these processes to the teachings disclosed herein when practicing the present invention.

As shown in FIG. 1, in one embodiment of the invention the attachment device 18 is utilized to attach a placard 11 to the nursery container 16. The placard 11 preferably includes a display surface with indicia of interest to nursery personnel and/or the ultimate purchaser. For example, the placard 11 may include bar coding which provides pricing and other relevant information to check-out or inventory personnel. The placard 11 may also include care instructions related to the plant contained within the container.

Figure 4:
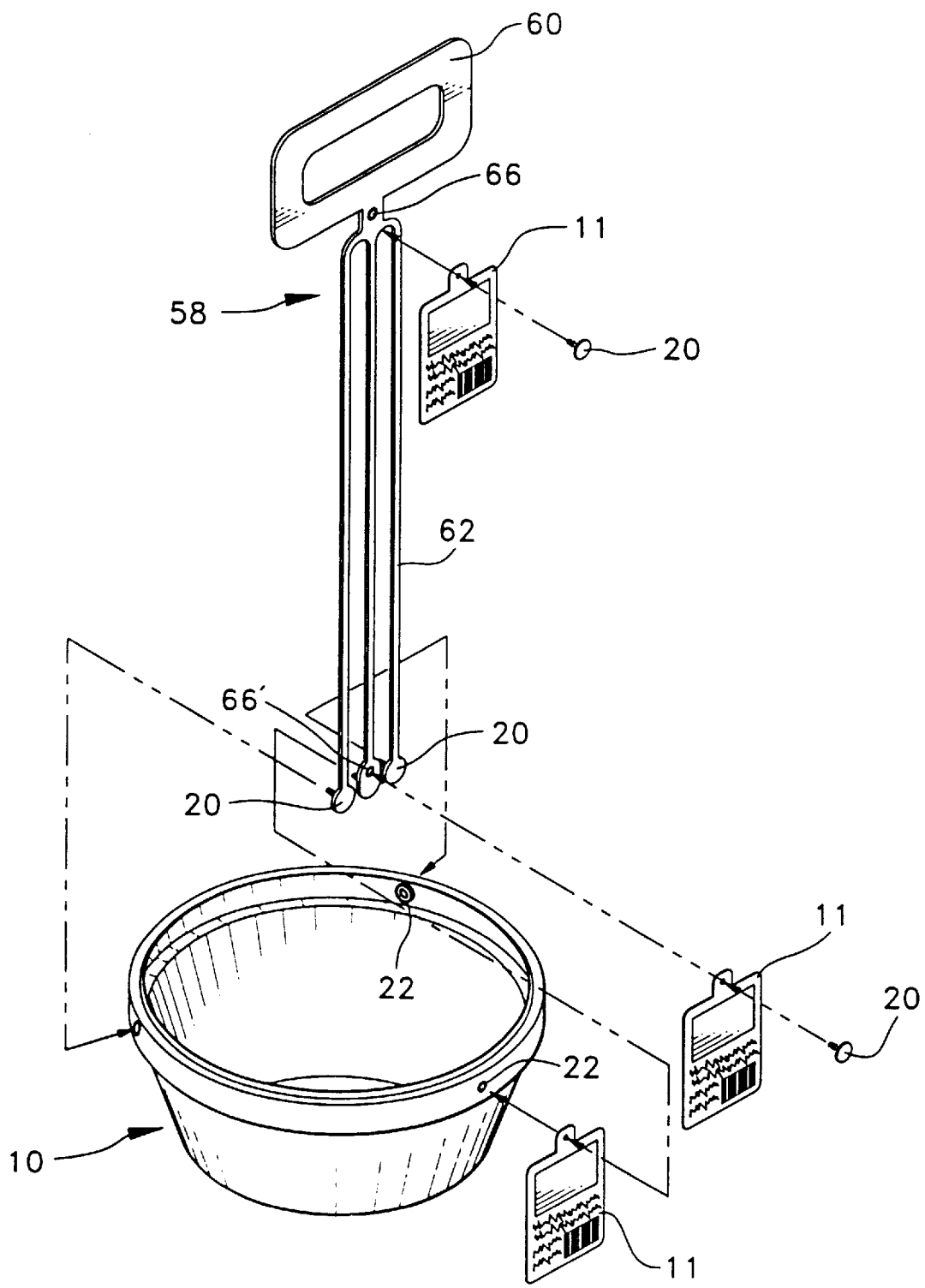
FIG. 4 is an exploded isometric view of the present invention illustrating the attachment of a handle to the nursery container.
Figure 4A:
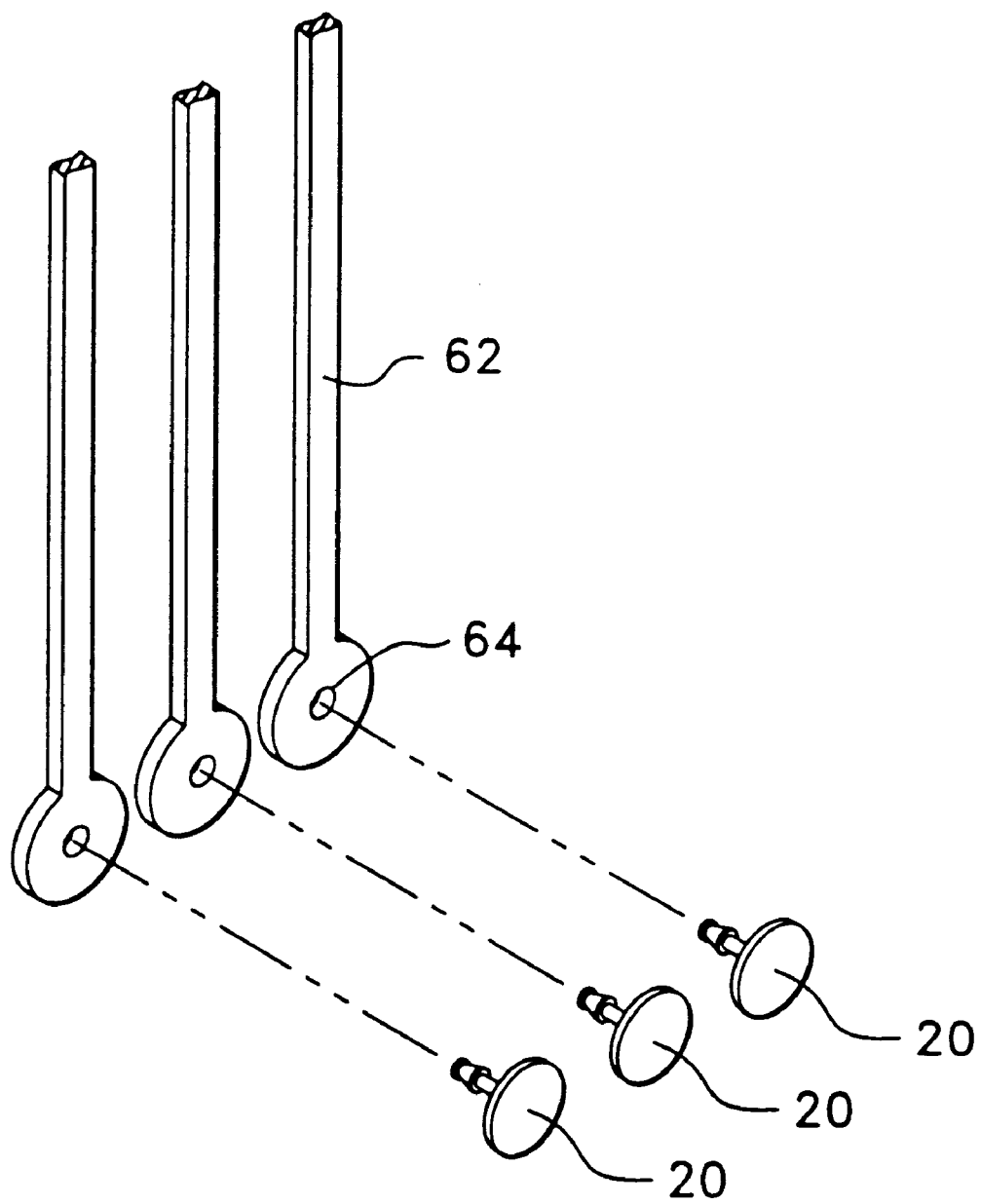
FIG. 4A is a partial isometric view of an alternate embodiment for attaching the handle of FIG. 4 to the container.

FIGS. 4–8 illustrate some alternate configurations of the nursery container 10 illustrating other ancillary or attachable items which can be utilized with the present invention. Referring to FIG. 4, an embodiment of the invention is shown wherein a handle 58 is the ancillary item that is attached to the nursery container 10 instead of (or, as shown, in addition to) the placard 11. The handle 58 has a grip 60 configured for grasping by a person's hand. Arms 62 are attached to and depend from the grip 60. The distal end of each arm 62 includes a pin member 20. The pin members 20 shown in FIG. 4 are formed integral with the arms 62. In order to adequately suspend the container 10, the handle 58 preferably has at least three depending arms 62 which mount to the locking members 22 on the nursery container 10 at three spaced apart locations (preferably equidistant from one another). While the pin members 20 are shown in FIG. 4 as being integral with the arms 62, it is also contemplated that the pin members 20 could be inserted through holes 64 formed in the depending arms 62 (similar to the insertion of the pin members into the placard 11 described above with reference to FIGS. 1 and 3). This embodiment of the invention is shown in FIG. 4A.

It should be readily apparent to those skilled in the art that if the nursery container 10 has pin members 20 formed about its periphery, then the handle 58 would, instead, have a plurality of locking members 22 formed on the arms 62.

Figure 7:
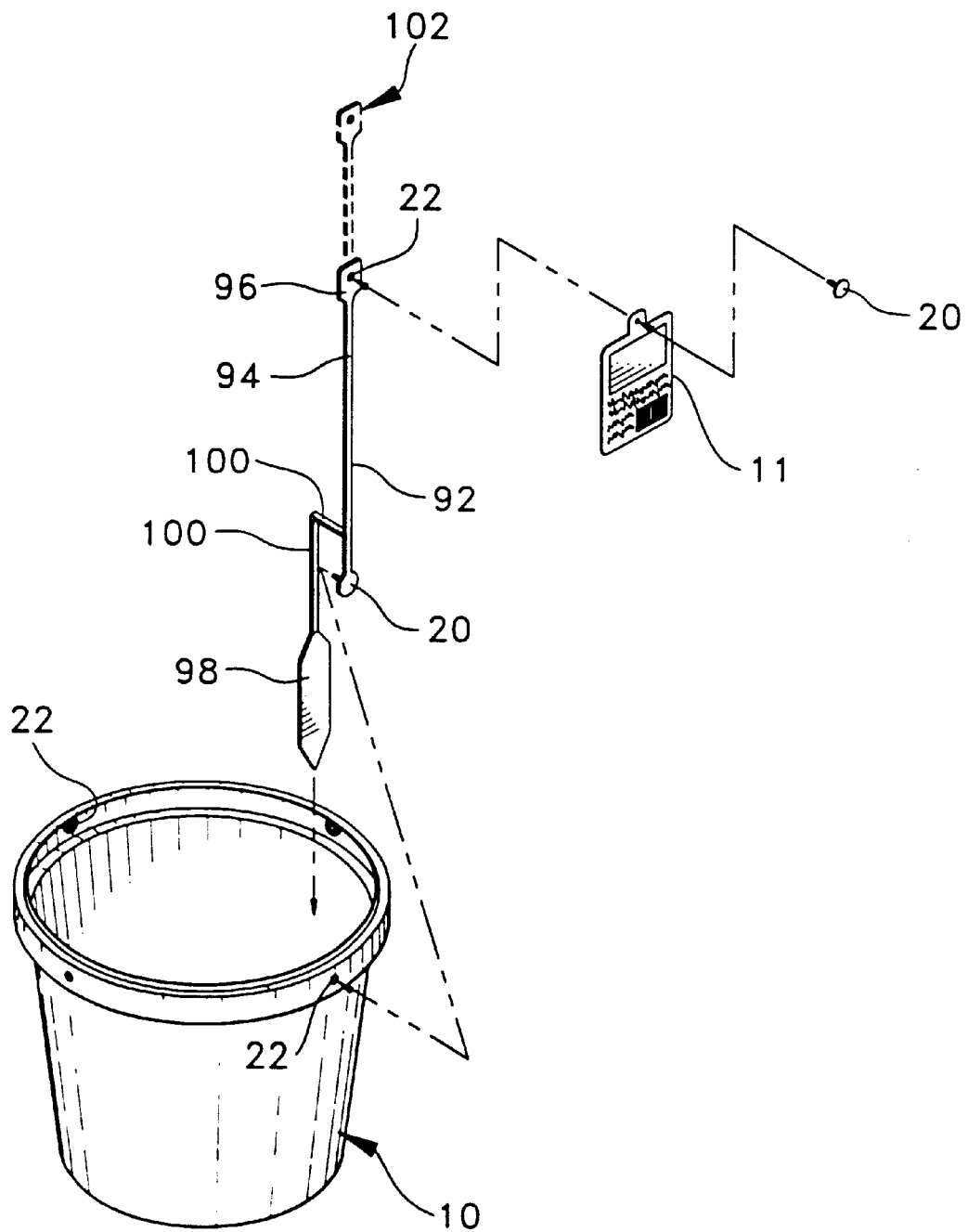
FIG. 7 is an exploded isometric view of a display stake which is attached to the nursery container according to the present invention.

The handle 58 shown in FIG. 4 preferably also includes a placard mounting member 66 formed in the arm 62 or the grip 60 for attaching a display placard 11 to the handle 58 with a pin member 20. The placard mounting member 78 includes a locking member 22 (not shown) attached to a hole formed in the handle 58 in a similar manner as discussed above for attaching the locking member 22 to the container 10. The locking member 22 receives a pin member 20 formed on the display placard 11. In an alternative configuration, the pin member 20 can be formed on the handle 58 (either integral with or attached to the handle 58.) The display placard 11 would have a locking member 22 attached to it for engaging with the pin member 20 on the handle 58. An additional placard mounting member 66' is shown on one of the depending arms proximal to the pin member 20. While multiple display placards 11 are shown in FIG. 7, it should be readily understandable that the number of placards 11 utilized depends on the desired use for and arrangement of the nursery container 10. As shown, a pin member 20 on an arm 62 could be used to attach the display placard 11 directly to the nursery container 10, as opposed to the placard 11 being attached to the handle 58.

In a preferred embodiment, the handle 58 is made by injection molding plastic material, such as polyethylene, polypropylene, or acetal resin. One form of acetal resin suitable in the present invention is manufactured by Du Pont (UK) Ltd., Stevenage, England and sold under the trade name DELRIN™. Alternate methods of manufacture and other types of materials may be substituted for these preferred features.

Figure 5:
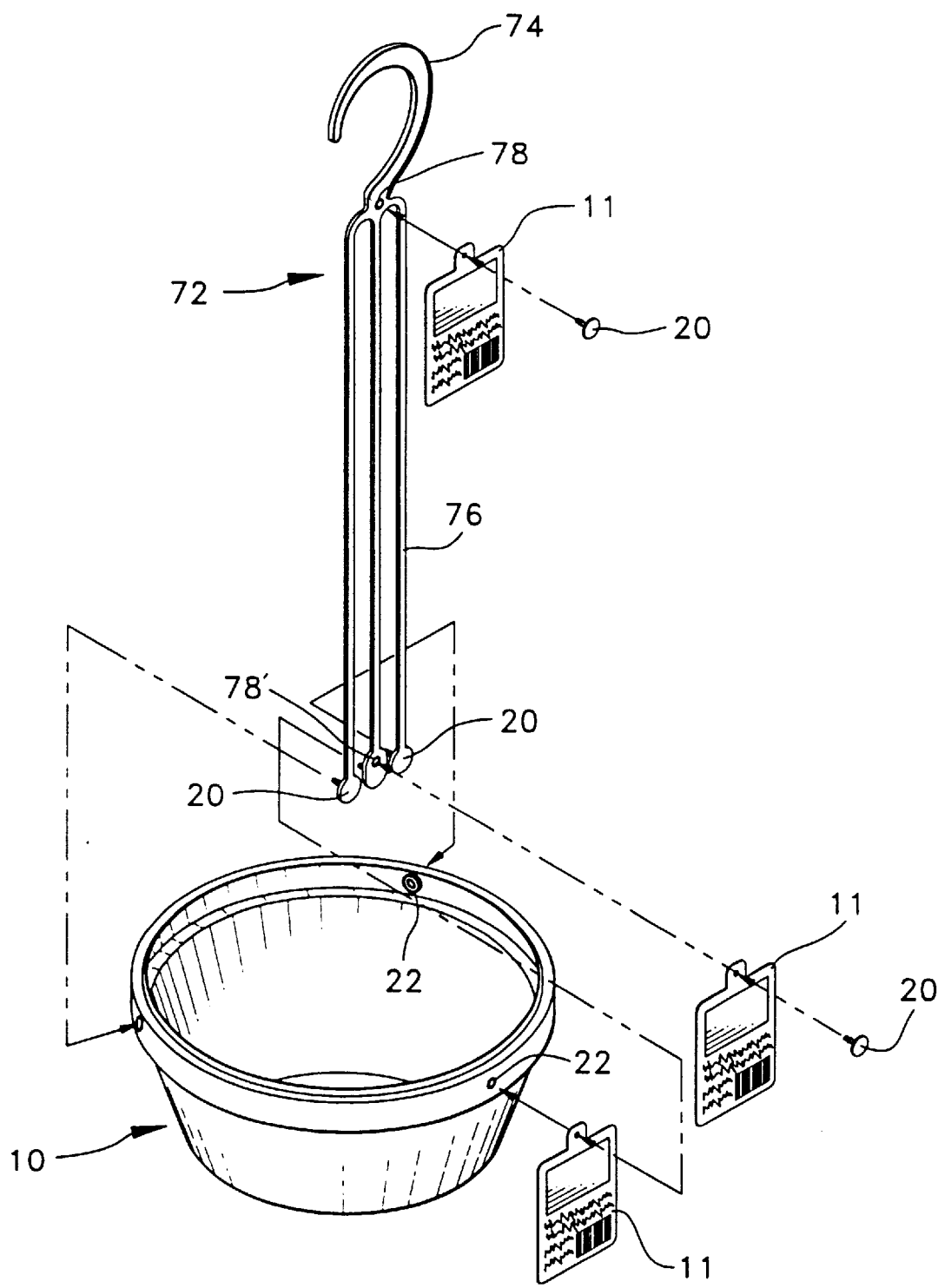
FIG. 5 is an exploded isometric view of a hanger which is attached to the nursery container according to the present invention.

FIG. 5 illustrates a hanger 72 for attaching to the nursery container 10 of the present invention. The hanger 72 includes a conventional hook portion 74 and a plurality of depending arms 76. As with the handle 58 discussed above, the distal end of each arm 76 includes a pin member 20 formed integral with or attached to the arm 76. The hanger 72 may be made by any suitable manufacturing process, such as injection molding. The preferred material from which the hanger 72 is manufactured is plastic material, such as polyethylene, polypropylene, or acetal resin.

Figure 6:
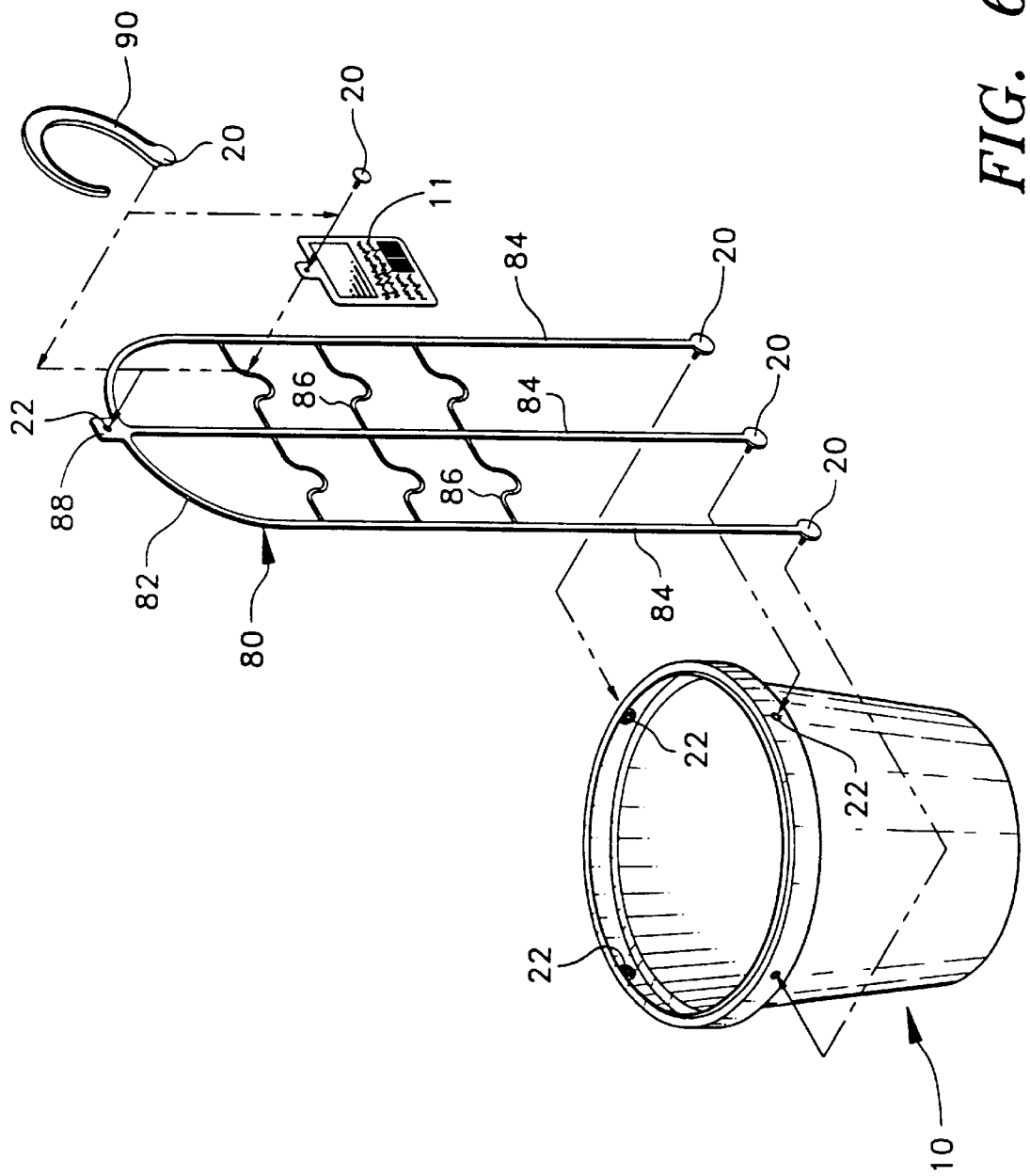
FIG. 6 is an exploded isometric view of a trellis which is attached to the nursery container according to the present invention.

Referring now to FIG. 6, a trellis 80 is shown for use in the present invention. The trellis 80 is designed to attach to the nursery container 10 to assist in growing plants contained within the container. The trellis 80 preferably includes an arch 82 with a plurality of vertical supports 84 extending downward from the arch 82. Cross members 86 extend between the vertical supports 84 to form a lattice-type arrangement. There are a wide variety of trellis configurations known to those skilled in the art. Accordingly, the exemplary embodiment illustrated is not intended to limit the scope of the invention.

Attachment components are formed at the distal ends of the vertical supports 84 which mate with complimentary attachment components on the nursery container 10. Each vertical support 84 preferably has a pin member 20 formed on it as shown which mates with a locking member 20 formed on the nursery container 10. As discussed above with respect to the handle 58 shown in FIGS. 4 and 4A, the pin members 20 can be formed integral with the vertical supports 84 or inserted into holes formed through it.

A mounting tab 88 is formed on the trellis 80 preferably at its top. The mounting tab 88 includes a locking member 22 attached to the mounting tab 88 through a hole. A display placard 11, with a pin member 20 attached to it, is engaged with the locking member 22 on the mounting tab 88 to secure the placard 11 to the trellis 80. It is also contemplated that an attachable hook 90 can be attached to the mounting tab 88 if desired. The attachable hook 90 has a pin member 20 attached to it similar to the various embodiments discussed above.

The trellis 80 may be made by any suitable manufacturing process, such as injection molding. The preferred material from which the trellis 80 is manufactured is plastic, such as polyethylene, polypropylene, or acetal resin.

FIG. 7 illustrates a display stake 92 which can also be utilized with the nursery container 10 of the present invention. The display stake 92 includes a vertical stake 94 with a pin member 20 attached to its lower end. The pin member 20 is configured to engage with a locking member 22 formed on the nursery container 10. The display stake 92 also has at least one display tab 96 formed at or near the top of the vertical stake 94. The display tab 96 includes a locking member 22 attached to the tab through a hole. A display placard 11 is attached to the locking member 22 by means of a pin member 20 as shown.

The display stake 92 also includes a brace 98 for supporting the vertical stake 94. The brace 98 is attached to the vertical stake 94 by truss members 100 which position the brace 98 against the inside surface of the side wall 12. The brace 98 prevents the vertical stake 94 from rotating about the lip 16 of the container 10. Shown in phantom in FIG. 7 (and identified by numeral 102) is an additional display tab which may be formed on the display stake 92.

The display stake 92 provides a device for easily and conveniently locating a display placard or other information on a nursery container 10 made according to the present invention. As with the trellis 80, the display stake 92 may be made by any suitable manufacturing process, such as injection molding. Preferably the display stake 92 is manufactured from plastic material, such as polyethylene, polypropylene, or acetal resin.

Figure 8:
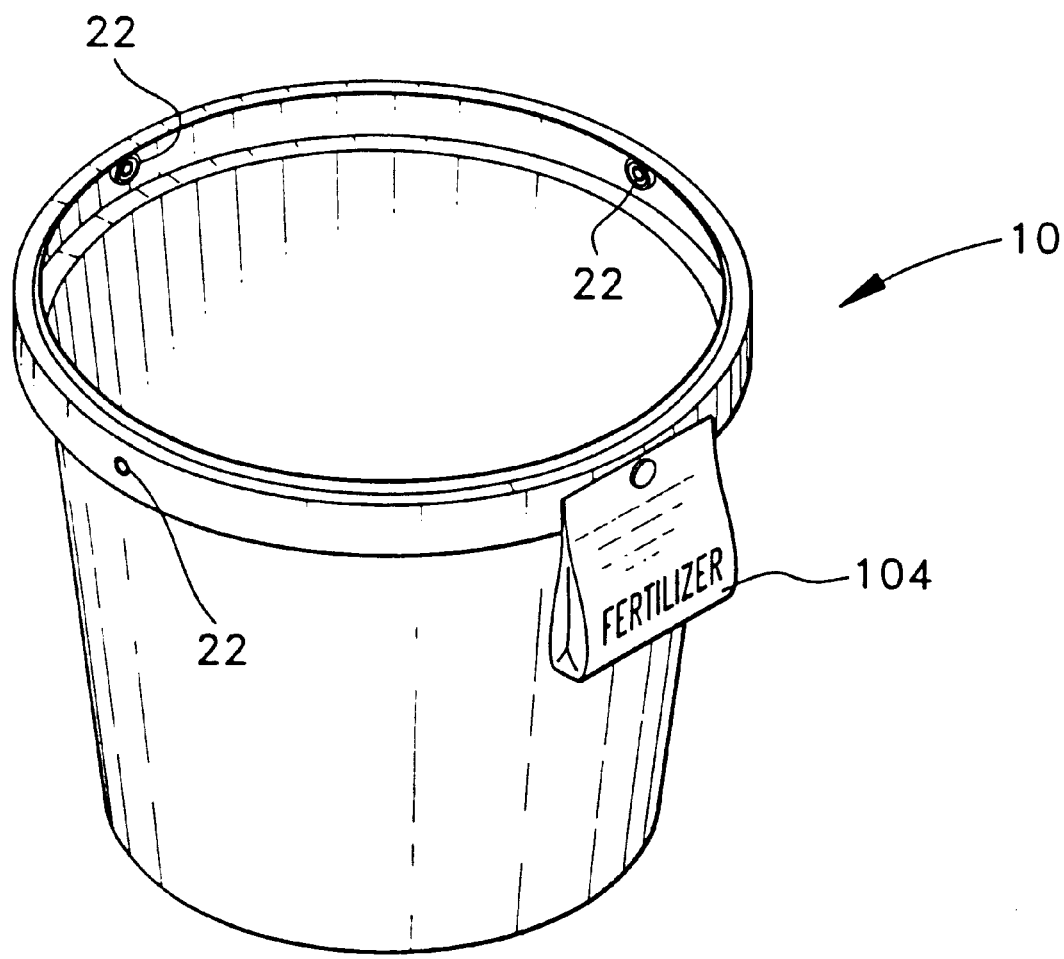
FIG. 8 is an isometric view of a nursery container with a promotional/supplementary bag attached to it according to the present invention.

FIG. 8 illustrates an isometric view of a nursery container 10 according to the present invention with an attachable bag 104 affixed to it. The bag 104 is attached to the container through use of the above-described attachment device 18. The base 24 of the pin member 18 is all that can be seen of the attachment device in FIG. 8. The bag can be utilized for carrying promotional items or plant care materials, such as fertilizer.

The present invention as described above and illustrated in the accompanying figures provides a novel nursery container design for attaching various ancillary and informational items to the container. The preferred locking member 22 and pin member 20 attachment components are designed to be substantially non-removable once engaged. Thus, detachment of a placard containing pricing information or other ancillary items is inhibited or completely prevented. Preferably, a prescribed amount of force is necessary to remove the ancillary item so that it does not inadvertently fall off prior to sale. By utilizing an attachment device which inhibits removal, the retailer will be able to ascertain that the nursery container 10 was tampered with if no placard 11 or other ancillary item is attached.

Also, it may be desirable to form one or both of the attachment components with portions which fracture or break away when the two components are separated. This would prevent the person who removed the item to attempt to attach the same item to a different container. For example, the boss 30 on the pin member 20 may be designed to break off when the pin member 20 is removed from the locking member 22. As such, any attempt to reattach the pin member 20 to another locking member 22 would be fruitless. This attachment configuration prevents individuals from attempting to switch placards (such as plant prices) or ancillary items between containers.

Figure 9:
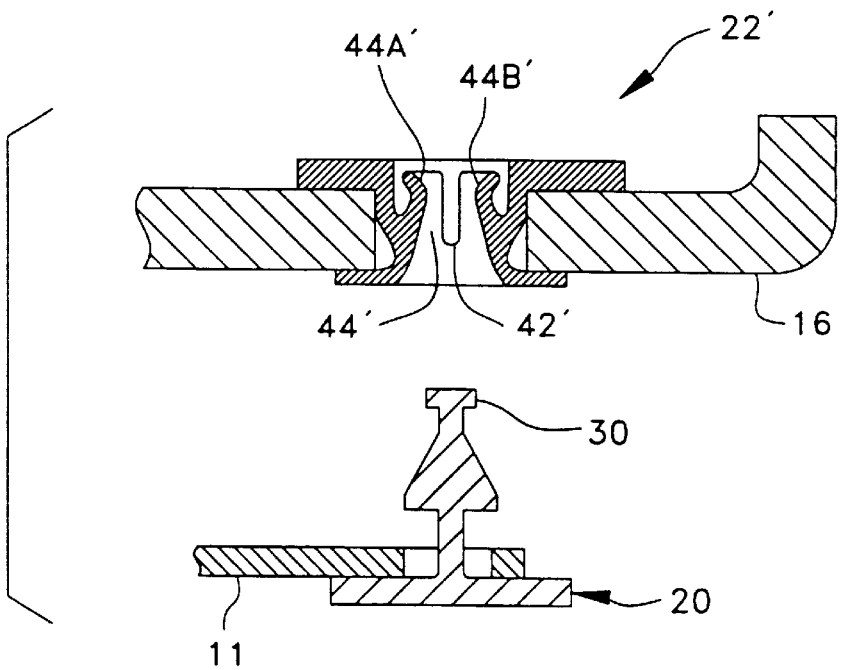
FIG. 9 is a cross-sectional view of an alternative attachment device according to the present invention.

The present invention also contemplates the use of pin and locking members which are detachable from one another. See, for example, FIG. 9 which shows an alternate arrangement for the locking member 22'. In this embodiment, the locking member 22' does not have locking ridges as shown in FIG. 3. Instead, the retention tabs 44' include surfaces angled or flared outward $44_A$' after a reduced diameter neck portion $44_B$'. (The neck portion functions as the locking ridge to retain the boss 30 within the channel.) The angled surfaces $44_A$', working in conjunction with the notches 42', are designed to deflect or bend to permit the boss 30 on the pin member 20 to slide out of the locking member 22' when sufficient force is applied to disengage the pin member 20 from the locking member 22'.

Figure 10:
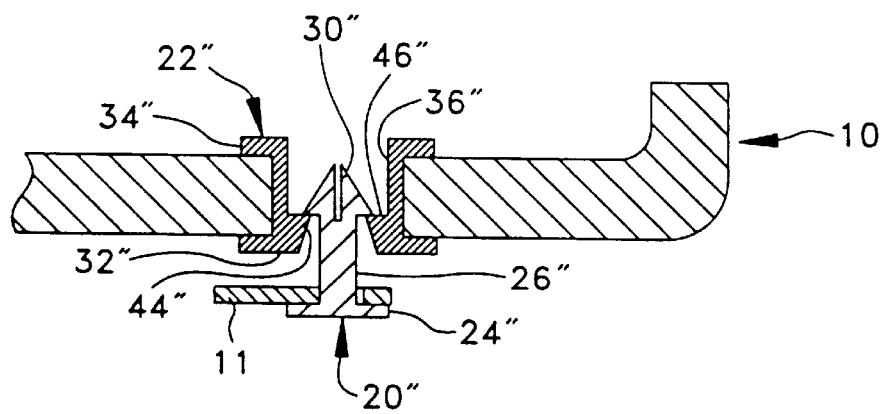
FIG. 10 is a cross-sectional view of another alternative attachment device according to the present invention.

Additionally, as discussed above, a variety of other attachment devices are contemplated for use with the present invention, such as the attachment devices shown in U.S. Pat. Nos. 5,448,846 and 4,221,063. The disclosures in those patents are incorporated herein in their entirety. One alternate embodiment of the attachment device is shown in FIG. 10. In this embodiment, the pin member 20" has a base 24", a shank 26", and a boss 30". The locking member 22" has a base 34", a receptacle 32", a channel 36", retention tabs 44", and a locking ridge 46". A notch 31" is formed in the boss 30" to permit the boss 30" to fit between the retention tabs 44". In light of the teachings disclosed in this specification, those skilled in the art would be capable of modifying the various embodiments shown. Such modifications are well within the purview of the claims.

While the preferred embodiments of the nursery container 10 illustrated in the figures and discussed above mount the first attachment component (i.e., the pin member or the locking member) directly to the lip 16, it is also contemplated, and well within the purview of the claims, that the first attachment device can be mounted to the side wall of the container. Those skilled in the art would readily understand how to modify the nursery container to do so in light of the above teachings.

Additionally, although the various embodiments have been described separately, many of the components can be interchanged. For example, while a hook 90 is shown in FIG. 6 as being optionally attached to the trellis, a grip similar to the grip 60 shown in FIG. 4 may instead be used. Also, as with the nursery container 10, the ancillary items are illustrated with preferred arrangements for the attachment components. However, it is contemplated that the arrangement of the attachment components can be reversed. For example, the mounting tab 88 on the trellis 80 could have a pin member 20 attached to it and the attachable hook 90 could have a locking member 22 attached to it.

Figure 11:
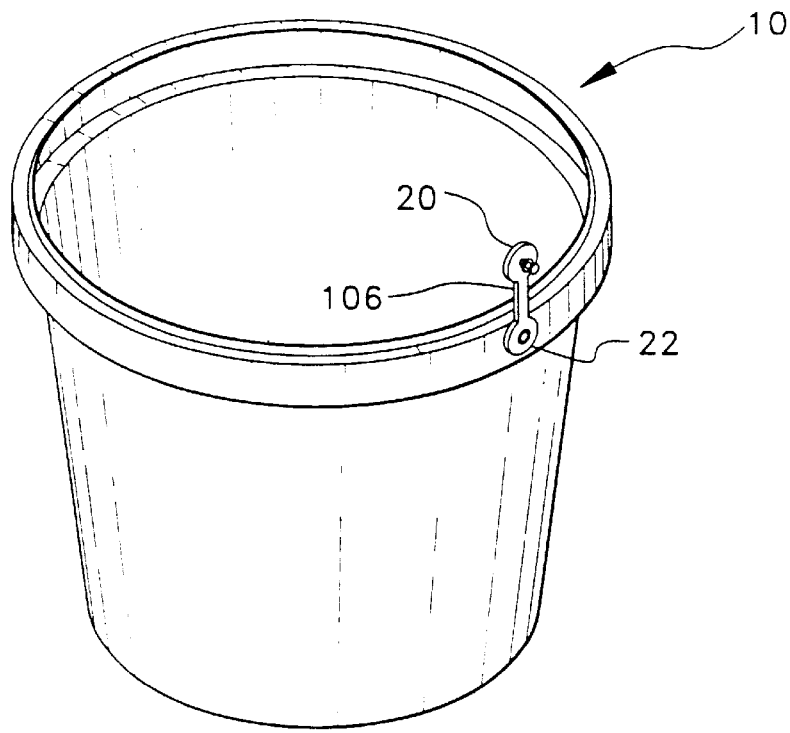
FIG. 11 is an isometric view of an alternate embodiment of the attachment device according to the present invention.
Figure 11A:
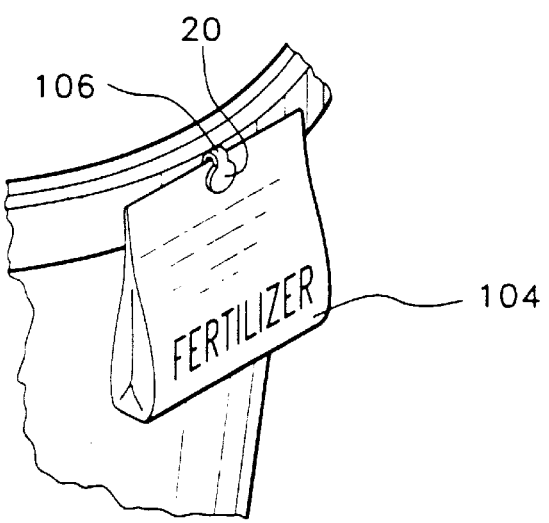
FIG. 11A is a partial isometric view of the attachment embodiment of FIG. 11 illustrating the attachment of an ancillary item to the nursery container.

Referring now to FIGS. 11 and 11A, a further embodiment of the invention is shown wherein the pin member 20 is attached to the locking member 22 with a strap 106. The strap 106 has suitable flexibility to permit the pin member 20 to be engaged with the locking member 22 as shown in FIG. 11A when it is desired to attached an ancillary item to the container 10. This embodiment of the invention eliminates the need for the nursery or retailer to obtain and store separate pin members 20. Instead, the container 10 includes all the components necessary for attaching an ancillary item to the container.

The present invention addresses and solves the deficiencies described above that exist in the nursery industry. Since the attachment components are formed on the nursery containers and ancillary items, the nurseries and retailers who buy the containers do not need separate equipment for attaching the various items. Also, the present invention will work with any size or shape of placard provided it has a hole formed in it to receive the pin member. Hence, nurseries and retailers do not need to modify their current inventory of pricing information.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

We claim:

1. A nursery container for a plant comprising:
    a bottom;
    a side wall extending upward from the bottom, the side wall including a lip formed on an upper portion of the side wall distant from the bottom, the side wall having a hole formed through it; and
    a first attachment component attached to the nursery container and adapted to mate with a second attachment component for attaching an ancillary item to the nursery container, the first attachment component being separate from the container, the first attachment component extending through the hole formed in the side wall and having a base located adjacent to an inside surface of the nursery container and a retaining flange located outside the container adjacent to an outer surface of the container, the retaining flange and the base acting in combination to prevent the first attachment component from separating from the container.

2. A nursery container according to claim 1 wherein the first attachment component is a locking member having a channel formed in it, the channel adapted to receive and retain a portion of the second attachment component.

3. A nursery container according to claim 2 further comprising a second attachment component, the second attachment component being a pin member with a boss which engages with and is retained by the locking member when second attachment component is attached to the container.

4. A nursery container according to claim 1 further comprising a second attachment component for mating with the first attachment component.

5. A nursery container according to claim 4 wherein the first attachment component is a locking member and the second attachment component is a pin member, the pin member having a boss which engages with and is retained by the locking member when the ancillary item is attached to the nursery container.

6. A nursery container according to claim 1 wherein the ancillary item is a placard which is attached to the nursery container with a second attachment component.

7. A nursery container according to claim 6 wherein the first attachment component is a locking member and the second attachment component is a pin member, the pin member having a boss which engages with and is retained by the locking member when the placard is attached to the nursery container.

8. A nursery container according to claim 1 wherein the ancillary item is a trellis which is attached to the nursery container with a second attachment component.

9. A nursery container according to claim 8 wherein the first attachment component is a locking member and the second attachment component is a pin member, the pin member having a boss which engages with and is retained by the locking member when the trellis is attached to the nursery container.

10. A nursery container according to claim 1 wherein the ancillary item is a handle which is attached to the nursery container with a second attachment component, the handle having a grip formed thereon for grasping by a person's hand.

11. A nursery container according to claim 10 wherein the first attachment component is a locking member and the second attachment component is a pin member, the pin member having a boss which engages with and is retained by the locking member when the handle is attached to the nursery container.

12. A nursery container according to claim 10 wherein there are a plurality of first attachment components spaced apart from one another on the nursery container, and wherein the handle includes a plurality of arms depending from the grip, each arm being attached to a first attachment component on the nursery container by a second attachment component.

13. A nursery container according to claim 1 wherein there are a plurality of first attachment components spaced apart from one another on the nursery container, and wherein the ancillary item is a hanger having a hook and a plurality of depending arms, each arm being attached to a first attachment component on the nursery container by a second attachment component.

14. A nursery container according to claim 13 wherein the first attachment components are locking members and the second attachment components are pin members, each pin member having a boss which engages with and is retained by a corresponding locking member when the hanger is attached to the nursery container.

15. A nursery container according to claim 1 wherein the ancillary item is a display stake having a vertical stake portion with a display tab formed at an upper end of the vertical stake portion, the display tab having an attachment component adapted to receive a mating attachment component on a placard, wherein the second attachment component is located at a lower end of the vertical stake portion for attaching the vertical stake portion to the nursery container.

16. A nursery container according to claim 1 wherein the ancillary item is a bag which is attached to the nursery container with a second attachment component.

17. A nursery container according to claim 1 wherein the hole in the side wall is formed through the lip.

18. A nursery container for a plant comprising:
a bottom;
a side wall extending upward from the bottom, the side wall including a lip formed on an upper portion of the side wall distant from the bottom, the side wall having a hole formed through it; and
a locking member attached to the nursery container, the locking member adapted to receive and retain a pin member on an attachable item, the locking member including a base located against a first surface of the side wall, a receptacle attached to the base and extending through the hole in the side wall, the receptacle having a channel formed in it which is adapted to receive the pin member, a locking ridge formed on the receptacle and adapted to retain a portion of the pin member within the channel, and means for attaching the locking member to the container, the means for attaching being located against a second surface of the side wall, the means for attaching acting in conjunction with the base to secure the locking member to the nursery container by preventing the locking member from coming out of the hole in the side wall.

19. A nursery container according to claim 17 wherein the means for attaching the receptacle includes a retaining flange formed on an end of the receptacle.

20. A nursery container according to claim 19 wherein the channel defines a wall within the receptacle, the wall having at least one notch formed in it, the locking ridge being located at the tip of the notched portion of the wall.

21. A nursery container according to claim 17 further comprising a pin member formed on an attachable item, the pin member extending outward from the attachable item and having a boss formed thereon, the boss being disposed within the channel when the pin member is engaged with the locking member.

22. A nursery container according to claim 21 wherein the attachable item is selected from a group consisting of a placard, a trellis, a handle, a hanger, a stake, and a bag.

23. A nursery container according to claim 21 wherein the attachment of the pin member to the locking member is substantially nonremovable.

24. A nursery container for a plant comprising:
a bottom;
a side wall extending upward from the bottom and having a hole formed through it; and
a pin member separate from and attached to the nursery container, the pin member adapted to engage with and retain a locking member on an attachable item, the pin member including a base located against an inside surface of the side wall, a shank attached to the base extending through the hole in the side wall and radially outward from the container, and a retaining flange formed on the shank and located outside the nursery container adjacent to an outside surface of the side wall, the base and the retaining flange acting in combination to secure the pin member to the container.

25. A nursery container according to claim 24 wherein the retaining flange is a pin head formed on the shank, the pin head having a width that is larger than the hole in the side wall of the container to prevent the pin head from passing though the hole toward the inside of the container.

26. A nursery container according to claim 24 wherein the base is substantially flat on a side opposite the shank.

27. A nursery container according to claim 24 wherein the shank protrudes radially outward from the side wall of the container.

28. A nursery container for a plant formed by the process of providing a nursery container having a side wall, forming a hole through a portion of the side wall of the container; inserting a separate attachment component through the hole in the side wall so that a base on the attachment component is positioned within the container against the inside surface of the side wall; and locating a retaining flange outside the container adjacent to an outside surface of the side wall, the retaining flange being formed on the attachment component, the retaining flange and the base acting in combination to secure the attachment component to the container so that it cannot be easily removed from the hole in the side wall, wherein the attachment component is adapted to mate with a complimentary attachment component for attaching an ancillary item to the container.

29. In combination,
a nursery container for a plant including a bottom, a side wall extending upward from the bottom, the side wall including a lip formed on an upper portion of the side wall distant from the bottom, the side wall having a hole formed though it, and a first attachment component separate from and attached to the side wall of the nursery container, the first attachment component extending through the hole in the side wall and having a base which is positioned on one side of the container side wall and a retaining flange located on the other side of side wall, the base and the retaining flange preventing the first attachment component from coming out of the hole in the side wall; and
an ancillary item having a second attachment component on it, the second attachment component adapted to engage and be retained by the first attachment component for attaching the ancillary item to the nursery container.

30. A handle for attaching to a nursery container, the nursery container including a plurality of first attachment components spaced apart from one another on the nursery container, the first attachment components being separate from and attached to a side wall on the container, each first attachment component extending through an associated hole formed in the side wall and including a locking ridge, the handle comprising:
a grip for grasping by a person's hand;
a plurality of arms depending from the grip; and
a second attachment component attached to each arm and adapted to mate with a corresponding first attachment component on the nursery container for attaching the handle to the nursery container, the second attachment component having a base engaged with the arm, and a shank extending laterally outward from the base at a right angle to the arm, the shank having a boss formed on a distal end, the boss adapted to engage with and be restrained by the locking ridge on the first attachment component.

31. A placard for attaching to a nursery container, the nursery container having at least one first attachment component separate from and attached to a side wall on the container, the first attachment component extending through a hole formed in the side wall and including a locking ridge, the placard comprising:
a display surface for displaying indicia; and
a second attachment component attached to the placard and adapted to mate with the at least one first attachment component on the nursery container for attaching the placard to the nursery container, the second attachment component having a base located on one side of the placard, and a shank extending laterally outward from the base and through a hole in the placard, the shank having a boss formed on a distal end that is adapted to engage with and be restrained by the locking ridge on the first attachment component.

32. A placard according to claim 31 wherein the second attachment component includes a retaining flange which acts in combination with the base to secure the second attachment component to the display surface.

33. A hanger for attaching to a nursery container, the nursery container including a plurality of first attachment components spaced apart from one another on the nursery container, the first attachment components being separate from and attached to a side wall on the container, each first attachment component extending through an associated hole formed in the side wall and including a locking ridge, the hanger comprising:
a hook;
a plurality of arms depending from the hook; and
a second attachment component attached to each arm and adapted to mate with a corresponding first attachment component on the nursery container for attaching the hanger to the nursery container, the second attachment component having a base engaged with the arm, and a shank extending laterally outward from the base at a right angle to the arm, the shank having a boss formed on a distal end and adapted to engage with and be restrained by the locking ridge on the first attachment component.

34. A trellis for attaching to a nursery container, the nursery container including a plurality of first attachment components spaced apart from one another on the nursery container, the first attachment components being separate from and attached to a side wall on the container, each first attachment component extending through an associated hole formed in the side wall and including a locking ridge, the trellis comprising:
a plurality of vertical supports;
a plurality of horizontal supports connecting the vertical supports; and
a second attachment component attached to a lower end of each vertical support and adapted to mate with a corresponding first attachment component on the nursery container for attaching the trellis to the nursery container, the second attachment component having a base formed on the support, and a shank extending laterally outward from the base, the shank having a boss formed on a distal end which is adapted to engage with and be restrained by the locking ridge on the first attachment component.

35. A display stake for attaching to a nursery container, the nursery container having at least one first attachment component separate from and attached to a side wall on the container, the first attachment component extending through a hole formed in the side wall and including a locking ridge, the display stake comprising:
a vertical stake;
a display tab formed at an upper end of the vertical;

a second attachment component attached to a lower end of the vertical stake and adapted to mate with the at least one first attachment component on the nursery container for attaching the display stake to the nursery container, the second attachment component having a base formed on the stake, and a shank extending laterally outward from the base, the shank having a boss formed on a distal end that is adapted to engage with and be restrained by the locking ridge on the first attachment component;

a brace attached to the vertical stake and adapted to support the display stake when it is attached to the nursery container; and a third attachment component formed on the display stake, the third attachment component having a channel in it with a locking ridge, the third attachment component adapted to receive a pin member of an attachment component on a placard.

\* \* \* \* \*